(12) United States Patent
Finkelshtein et al.

(10) Patent No.: US 12,443,855 B2
(45) Date of Patent: Oct. 14, 2025

(54) OPTIMIZING CASCADE OF CLASSIFIERS SCHEMA USING GENETIC SEARCH

(71) Applicant: International Business Machines Corporation, Armonk, NY (US)

(72) Inventors: Andrey Finkelshtein, Beer Sheva (IL); Eitan Menahem, Beer Sheva (IL); Yuval Margalit, Ramat-Gan (IL); Sarit Hollander, Ramat Gan (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 843 days.

(21) Appl. No.: 17/699,547

(22) Filed: Mar. 21, 2022

(65) Prior Publication Data
US 2023/0297848 A1    Sep. 21, 2023

(51) Int. Cl.
*G06N 3/126* (2023.01)
*G06N 20/20* (2019.01)

(52) U.S. Cl.
CPC .............. *G06N 3/126* (2013.01); *G06N 20/20* (2019.01)

(58) Field of Classification Search
CPC ........ G06N 3/126; G06N 20/20; G06N 3/045; G06N 3/0464; G06N 5/01; G06N 7/01; G06N 20/10
See application file for complete search history.

(56) References Cited

U.S. PATENT DOCUMENTS

| | | | |
|---|---|---|---|
| 2007/0112701 A1 | 5/2007 | Chellapilla et al. | |
| 2008/0147577 A1 | 6/2008 | Bi et al. | |
| 2016/0335432 A1* | 11/2016 | Vatamanu | G06F 21/566 |
| 2017/0286839 A1 | 10/2017 | Parker | |
| 2018/0034842 A1 | 2/2018 | Smyth et al. | |
| 2018/0096261 A1 | 4/2018 | Chu et al. | |
| 2020/0184254 A1 | 6/2020 | Finkelshtein et al. | |
| 2020/0184278 A1* | 6/2020 | Zadeh | G06N 3/044 |

OTHER PUBLICATIONS

Balog al. "Multi-step Classification Approaches to Cumulative Citation Recommendation", InProceedings of the 10th Conference on Open Research Areas in Information Retrieval, 121-128, May 2013.

Brito Jr. et al. "Dynamic Selection of Classifiers-A Comprehensive Review", Pattern Recognition, 47 (11):3665-3680, 2014.

(Continued)

*Primary Examiner* — James T Tsai
(74) *Attorney, Agent, or Firm* — Robert R. Aragona

(57) ABSTRACT

A system and a method for training and classification using an optimized classification schema using an ensemble of cascaded classifiers is disclosed. Each of the cascaded classifiers is characterized by a set of classifier parameters and the classifiers which are not the first in a cascade are associated with one or more thresholds used to determine when to execute them according to a confidence measure computed by a preceding cascaded classifier. The optimization comprises a genetic algorithm applied to a set of ensembles of classification and parameters and the set of scores, into a pool of ensembles and associated scores. The scores may be based on associated classification quality and cost.

19 Claims, 8 Drawing Sheets

(56) References Cited

OTHER PUBLICATIONS

Chandra et al. "Evolving Hybrid Ensembles of Learning Machines for Better Generalisation", Neurocomputing, 69 (7-9):686-700, 2006.
Chellapilla et al. "Optimally Combining a Cascade of Classifiers", Document Recognition and Retrieval XIII, International Society for Optics and Photonics, 6067: 8 Pages, Jan. 16, 2006.
Didaci et al. "A Study on the Performances of Dynamic Classifier Selection Based on Local Accuracy Estimation", Pattern Recognition, 38(11): 2188-2191, Nov. 2005.
Dos Santos et al. "A Dynamic Overproduce-and-Choose Strategy for the Selection of Classifier Ensembles", Pattern Recognition, 41(10):2993-3009, Oct. 1, 2008.
Giacinto et al. "Methods for Dynamic Classifier Selection", InProceedings 10th International Conference on Image Analysis and Processing, 659-664, 1999.
Ko et al. "From Dynamic Classifier Selection to Dynamic Ensemble Selection", Pattern Recognition, 41 (5):1718-1731, May 2008.
Kwon. "Speed Sign Recognition Using Sequential Cascade AdaBoost Classifier with Color Features", Journal of Multimedia Information System, 6(4): 185-190, Dec. 31, 2019.
Ou et al. "Cascade AdaBoost Classifiers with Stage Optimization for Face Detection", ICB: Advances in Biometrics, 121-128, 2006.
Plawiak et al. "Application of New Deep Genetic Cascade Ensemble of SVM Classifiers to Predict the Australian Credit Scoring", Applied Soft Computing 84: 15P., Nov. 2019.
Polap. "An Adaptive Genetic Algorithm as a Supporting Mechanism for Microscopy Image Analysis in a Cascade of Convolution Neural Networks", Applied Soft Computing, 97 (106824): 22P., Dec. 2020.
Raykar et al. "Designing Efficient Cascaded Classifiers: Tradeoff between Accuracy and Cost", Proceedings of the 16th ACM SIGKDD International Conference on Knowledge Discovery and Data Mining, 8P., Jul. 2010.
Street et al. "A Streaming Ensemble Algorithm (SEA) for Large-Scale Classification", InProceedings of the Seventh ACM SIGKDD International Conference on Knowledge Discovery and Data mining , 377-382, 2001.
Sychel et al. " Branch-and-Bound Search for Training Cascades of Classifiers", International Conference on Computational Science, Springer, 18-34, Jun. 3, 2020.
Xiao et al. "Dynamic Classifier Ensemble Model for Customer Classification with Imbalanced Class Distribution", Expert Systems with Applications, 39(3):3668-3675, Feb. 15, 2012.
Xu et al. "Classifier Cascades and Trees for Minimizing Feature Evaluation Cost", Journal of Machine Learning Research , 15: 2113-2144, Jun. 2014.
Yuan. "PhD Forum: Deep Learning-Based Real-Time Malware Detection with Multi-Stage Analysis", In2017 IEEE International Conference on Smart Computing (SMARTCOMP), 2P, 2017.
Zhang et al. "An Automatic Construction and Organization Strategy for Ensemble Learning on Data Streams", ACM SIGMOD Record, 35(3):28-33, Sep. 2006.
Zhu et al. "Dynamic Classifier Selection for Effective Mining from Noisy Data Streams", InFourth IEEE International Conference on Data Mining (ICDM'04), 305-312, 2004.

\* cited by examiner

1. Initiate a population of K instances (CSIs)
2. Loop max iterations
    1. Evaluate the "fitness" score of each CSI in the population
    2. Find and save the fittest CSI
    3. If maximal fitness score reached a pre-defined score or converged:
        1. Break (Exit loop)
    4. Else:
        1. For i=1 to K:   //create new population of size K for the next iteration
            1. Select randomly two CSIs (Fit instances have higher probability of being selected)
            2. Perform a crossover over the two CSIs to create a new CSI
            3. With a small probability make a minor change to the instance (mutation)
            4. Add the new instance to the next iteration population
3. return best instance found

FIG. 8

OPTIMIZING CASCADE OF CLASSIFIERS SCHEMA USING GENETIC SEARCH

BACKGROUND

The present disclosure, in some embodiments thereof, relates to machine learning based classification more specifically, but not exclusively, to a design and training of cascaded classifier ensembles using genetic algorithms.

In many domains there are multiple methods, classifiers, configurations, techniques and the like to perform the task of classification or prediction. These techniques may vary in accuracy and may have other advantages such as faster classification, cheaper classification, less intrusiveness and the like. Therefore the choice may consider a plurality of factors.

Classification refers to predicting a class of an observation. For example, a medical test result of a patient may be processed by one or more classification models to determine which syndrome a patient is likely to suffer. Another example is user authentication for authorizing access to a resource. Classification of software as malicious and unauthorized credit card use detection are additional examples of classification.

Different machine learning models that address the same classification problem have different operation property requirements, such as classification accuracy, speed and computer resource consumption. Choosing the optimal models for the problem vest meets the required characteristics, such as high accuracy, fast classification, small memory footprint and the like, may be a complex task.

There are several known such as selecting a pre-defined subset of machine-learning models that meets most of the above mentioned operation property requirements. This approach requires defining which subset of models fits the best to all the constraints of the system.

Followingly, this approach requires selecting the best suited models for each classification task, i.e. for that specific task. This approach requires a heuristic for choosing model per task.

Another approach is to apply subsets of models in an incremental manner until achieving a satisfying result for a task such as classification, prediction and/or the like, The task may be performed in stages, where each stage applies more, or more complex models to solve the task, and if the output of the current stage is not satisfying the next stage is applied. This approach requires a strategy, for example the order of applying the algorithms, and a satisfaction clause, i.e. when to stop the incremental process.

Some prior art implementations apply the classic approach of training and evaluation, i.e. measuring the classification performance of multiple models and selecting the best model that best fits the constraints of the system.

Some other prior art implementations select models per task by analyzing the attributes of the subject in the task, i.e. compare the attributes to a known population and select models that worked well for similar objects from the population. Alternative methods use techniques to define which models work well for different values of the subject's attributes.

Some other prior art implementations that apply models incrementally, are solutions that have a different modeling of the problem. These implementations apply a single type of ML algorithm, such as AdaBoost or Neural Network, and may limit the solution to a very small incremental schema two or three stages, or allow stages that are not the final stage in the classification schema to classify or predict only one of the classes in the task, i.e. for example, classify files only as benign and allowing only the final stage to classify files as malicious. Moreover, only few solve the problem using a genetic algorithm.

SUMMARY

It is an object of the present disclosure to provide a system and a method for training and optimizing an ensemble of cascaded classifiers and controlling data flow therein.

According to an aspect of some embodiments of the present disclosure there is provided a method for optimizing an ensemble of cascaded classifiers for a task of classification of a plurality of observations, each to a class from a plurality of classes, the method comprising:
in each of a plurality of iterations:
computing a set of scores, each associated with one of a set of ensembles of classification parameters, each ensemble of classification parameters, characterizing an ensemble of cascaded classifiers for execution by at least one hardware processor, each ensemble of classification parameters comprising:
a first set of classifier parameters, characterizing a first cascaded classifier from the ensemble of cascaded classifiers;
a second set of classifier parameters, characterizing a second cascaded classifier from the ensemble of cascaded classifiers; and
at least one threshold used to determine when to execute the second cascaded classifier by at least one hardware processor, using a confidence measure computed by the first cascaded classifier;
aggregating a plurality of new ensembles of classification parameters and associated scores from the set of scores by applying a genetic algorithm to the set of ensembles of classification parameters and the set of scores, into a pool of ensembles and associated scores; and
using the pool of ensembles of classification parameters in a consecutive iteration of the plurality of iterations; and
identifying a preferred ensemble of classification parameters, in the pool of ensembles and associated scores, using a score associated with each ensemble of classification parameters in the pool of ensembles and associated scores.

According to an aspect of some embodiments of the present disclosure there is provided a system for optimizing an ensemble of cascaded classifiers for a task of classification of an observation to a class from a plurality of classes, comprising at least one hardware processor adapted to:
in each of a plurality of iterations:
compute a set of scores, each associated with one of a set of ensembles of classification parameters, each ensemble of classification parameters, characterizing an ensemble of cascaded classifiers for execution by at least one hardware processor, each ensemble of classification parameters comprising:
a first set of classifier parameters, characterizing a first cascaded classifier from the ensemble of cascaded classifiers;
a second set of classifier parameters, characterizing a second cascaded classifier from the ensemble of cascaded classifiers; and
at least one threshold used to determine when to execute the second cascaded classifier the by at least one hardware processor, using a confidence measure computed by the first cascaded classifier;

aggregate a plurality of new ensembles of classification parameters and associated scores from the set of scores by applying a genetic algorithm to the set of ensembles of classification parameters and the set of scores, into a pool of ensembles and associated scores; and use the pool of ensembles of classification parameters in a consecutive iteration of the plurality of iterations; and identify a preferred ensemble of classification parameters, in the pool of ensembles and associated scores, by comparing a score associated each ensemble of classification parameters in the pool of ensembles and associated scores.

According to an aspect of some embodiments of the present disclosure there is provided a system for a classification task comprising at least one hardware processor adapted to execute an ensemble of cascaded classifiers for a task of classification of an observation to a class from a plurality of classes, wherein the at least one hardware processor is adapted to:

access an ensembles of classification parameters, comprising an ensemble characterizing an ensemble of cascaded classifiers, and at least one threshold used to determine when to execute a second cascaded classifier, using a confidence measure computed by the first cascaded classifier, wherein the ensembles of classification parameters trained by applying a genetic algorithm to at least one of the ensemble of cascaded classifiers;

classify an observation to classify as one of a plurality of classes by the ensemble of cascaded classifiers; and output the classification of the observation to classify.

Optionally, computing a plurality of new ensembles of classification parameters by applying a genetic algorithm comprises computing at least one new ensemble of classification parameters comprising at least part of each of a plurality of ensembles of classification parameters, each selected according to the set of scores.

Optionally, computing the at least one new ensembles of classification parameters further comprises modifying at least one set of classifier parameters or the at least one threshold of the at least one new ensemble of classification parameters.

Optionally, the plurality of parent ensembles of classification parameters comprises at least two ensembles of classification parameters of the set of ensembles of classification parameters.

Optionally, computing the at least one new ensembles of classification parameters further comprises adding a new set of classifier parameters, characterizing a new cascaded classifier added to the ensemble of classifiers.

Optionally, computing the at least one new ensembles of classification parameters further comprises removing at least one set of classifier parameters, characterizing a removed cascaded classifier from the ensemble of classifiers.

Optionally, each set of classifier parameters further comprising a classifier type identifier, and computing a plurality of new ensembles of classification parameters comprising modifying a classifier type identifier of at least one cascaded classifier from the ensemble of classifiers.

Optionally, the classifier type identifier refers to a type list, comprising at least one member of a group, consisting of support version machine, linear regression, tree ensemble classifier, and neural network.

Optionally, in a first iteration of the plurality of iterations, at least one of a set of ensembles of classification parameters comprising a different number of sets of classifier parameters, characterizing the different number cascaded classifiers, and at least one of the sets of classifier parameters comprising a classifier type identifier.

Optionally, computing a score while classifying, using the respective ensemble of cascaded classifiers, each of the plurality of observations to classify as one of the plurality of classes comprises:

computing a quality term indicative of an accuracy of classifying the plurality of observations to classify by the ensemble of cascaded classifiers using the respective ensemble of cascaded classifiers;

computing a cost term indicative of a memory size and power consumption of cascaded classifiers used when classifying the plurality of observations to classify by the ensemble of cascaded classifiers using the respective ensemble of cascaded classifiers;

computing a speed term indicative of a time consumption measure of cascaded classifiers used when classifying the plurality of observations to classify by the ensemble of cascaded classifiers using the respective ensemble of cascaded classifiers; and applying an identified weight function to the quality term, the cost term, the speed term and an identified tradeoff factor, indicative of a tradeoff between classification quality and classification speed, to produce the score.

Optionally, the ensemble of cascaded classifiers is trained by applying a genetic algorithm to at least one set of ensemble of cascaded classifiers by:

in each of a plurality of training iterations:

computing a set of scores, each associated with one of a set of ensembles of classification parameters, each ensemble of classification parameters, characterizing an ensemble of cascaded classifiers for execution by at least one hardware processor, each ensemble of classification parameters comprising:

a first set of classifier parameters, characterizing a first cascaded classifier from the ensemble of cascaded classifiers;

a second set of classifier parameters, characterizing a second cascaded classifier from the ensemble of cascaded classifiers; and at least one threshold used to determine when to execute the second cascaded classifier by at least one hardware processor, using a confidence measure computed by the first cascaded classifier;

aggregating a plurality of new ensembles of classification parameters and associated scores from the set of scores by applying a genetic algorithm to the set of ensembles of classification parameters and the set of scores, into a pool of ensembles and associated scores; and using the pool of ensembles of classification parameters in a consecutive iteration of the plurality of iterations; and identifying a preferred ensemble of classification parameters, in the pool of ensembles and associated scores, by comparing a score associated each ensemble of classification parameters in the pool of ensembles and associated scores.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof using an operating system.

For example, hardware for performing selected tasks according to embodiments of the disclosure could be implemented as a chip or a circuit. As software, selected tasks according to embodiments of the disclosure could be implemented as a plurality of software instructions being executed by a computer using any suitable operating system. In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the disclosure are herein described, by way of example only, with reference to the accompanying drawings and formulae. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 8 is a pseudocode of an exemplary genetic algorithm, according to some embodiments of the present disclosure.

DETAILED DESCRIPTION

Figure 1:
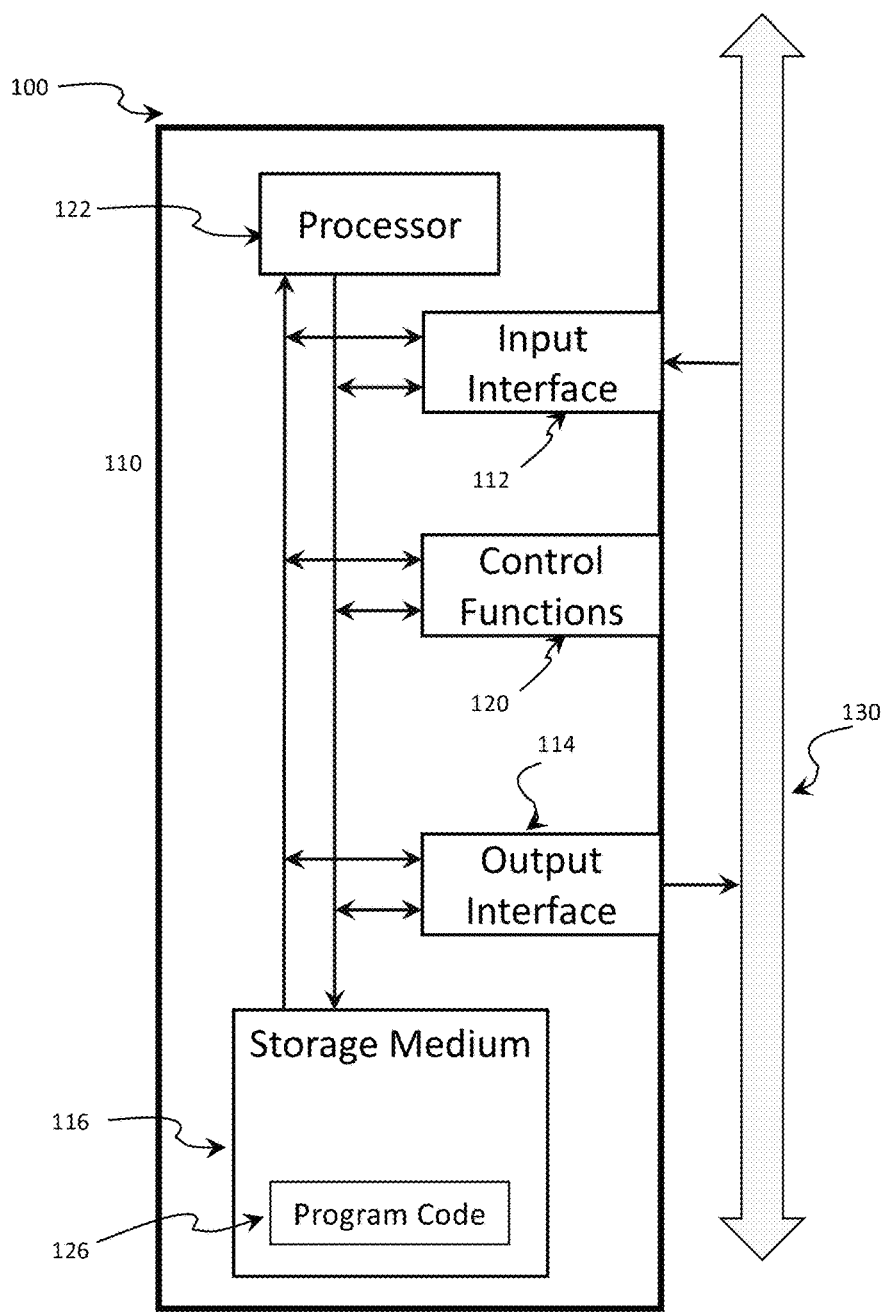
FIG. 1 is a schematic illustration of an exemplary system for training and inference with cascaded classifier ensembles, according to some embodiments of the present disclosure.

The present disclosure, in some embodiments thereof, relates to machine learning based classification more specifically, but not exclusively, to a design and training of cascaded classifier ensembles using genetic algorithms.

The present disclosure proposes incremental optimization of a staged inference schema. The disclosure comprises a method for finding a classification, or a prediction schema that optimizes the classification or the prediction quality with cost constrains, such as money, CPU usage, execution time, memory footprint and the like, in a very large space of possible schemas.

Some implementations of the present disclosure apply an ensemble of cascaded classifiers optimized for a weighted function of several terms, using an identified weight function to terms like a quality term, a cost term, a speed term and an identified tradeoff factor, indicative of a tradeoff between classification quality and classification speed and other cost factors.

The quality term may be indicative of an accuracy of classifying the plurality of observations to classify by the ensemble of cascaded classifiers using the respective ensemble of cascaded classifiers.

The cost term may be indicative of a memory size and power consumption of cascaded classifiers used when classifying the plurality of observations to classify by the ensemble of cascaded classifiers using the respective ensemble of cascaded classifiers.

The speed term may be indicative of a time consumption measure of cascaded classifiers used when classifying the plurality of observations to classify by the ensemble of cascaded classifiers using the respective ensemble of cascaded classifiers.

The inference may be referred to as classification for simplicity, and similarly, considerations such as speed, money, CPU usage, execution time, memory footprint, and the like, may be referred to as cost constraints.

The optimization may be performed by reducing the optimization problem to an AI search problem and solving it using AI search algorithm. The reduction may be performed using a modeling scheme that considers a large number of free variables, such as number of stages, decision threshold, models' types and models' hyper-parameters. Using the disclosed scheme, the optimization may be solved using AI search algorithms. The disclosure comprises, a genetic search algorithm, which is an evolutionary search based algorithm, designed for the optimization problem is disclosed.

The disclosed method comprises a "training" phase and a "classification" phase. In the training phase the search algorithm finds an optimized classification schema and trains machine learning models that implement the optimized classification schema. In the classification phase, the process receives an observation and provides classification by applying the classification schema on that observation.

Some embodiments of the present disclosure may apply a plurality of iterations in the training phase, wherein a set of scores, each associated with one of a set of ensembles of classification parameters, each ensemble of classification parameters, characterizing an ensemble of cascaded classifiers, wherein each of the cascaded classifiers is characterized by a set of classifier parameters and the classifiers which are not the first in a cascade are associated with one or more thresholds used to determine when to execute them according to a confidence measure computed by a preceding cascaded classifier. Iterations may be concluded by aggregating a plurality of new ensembles of classification parameters and associated scores from the set of scores, generated by applying a genetic algorithm to the set of ensembles of classification parameters and the set of scores, into a pool of ensembles and associated scores. The pool of ensembles of classification parameters may be used in a consecutive iteration, and for identifying a preferred ensemble of classification parameters, by comparing associated scores.

Some embodiments of the present disclosure may apply in the classification phase, an ensembles of classification parameters, comprising an ensemble characterizing an ensemble of cascaded classifiers, and at least one threshold used to determine when to execute a consecutive cascaded classifier, using a confidence measure computed by a preceding cascaded classifier, wherein the ensembles of classification parameters trained by applying a genetic algorithm to at least one of the ensemble of cascaded classifiers.

The ensemble of cascaded classifiers, characterized by the ensemble of classification parameters, wherein the application of consecutive classifiers is controlled by the at least one threshold, may be used to classify an observation to classify as one of a plurality of classes by the ensemble of cascaded classifiers, and output the classification of the observation to classify.

The disclosure may perform the classification optimization as an AI search task. The optimization may be performed by modeling classification schemas as search states in the AI search space of Classification Schema Instances (CSI). Each CSI may represent a possible classification schema so that each CSI may have different values of the free variables of the search space.

For example the ensemble of classification parameters may comprise the number of stages in the schema, which may be fixed as 3, range from 2 to 5, from 1 to 6, from 3 to 8, and/or the like. The ensemble of classification parameters may also comprise classifiers' types and hyper parameters of each stage. Classifier type options may comprise a set of classifiers from the variety of classifiers known to the person skilled in the art, for example Random Forest, Neural Network, Naïve Bayes, and the like.

The ensemble of classification parameters may also comprise classifiers' hyper parameters, which affect the performance and the cost of the models. For examples, Random Forest classifiers may have a max depth parameter, which may range for example from 3 to 4 or 5 to 20, and number of trees, which may range for example from 20 to 50, or from 10 to 200. Hyper parameters of SVM may comprise a kernel type, for example Sigmoid, or Polynomial. Logistic regression classifiers may have different loss function such as 11, 12 a combination thereof, number of iterations, such as 100 to 200, 100 to 500, or the like.

The ensemble of classification parameters may also comprise confidence thresholds. When the classification is binary, each stage in the schema there may be two thresholds a lower and upper threshold, which may determine when the classification result of the current state is conclusive, i.e. below the lower threshold or above the higher threshold, or inconclusive. Non-binary classification tasks may require additional thresholds. In some implementations of the present disclosure, the final stage may have only one threshold, for example, when the system may not return an inconclusive binary classification result.

Before explaining at least one embodiment of the disclosure in detail, it is to be understood that the disclosure is not necessarily limited in its application to the details of instructions and the arrangement of the components and/or methods set forth in the following description and/or illustrated in the drawings and/or the Examples. The disclosure is capable of other embodiments or of being practiced or carried out in various ways. Variations of the embodiments are apparent to the person skilled on the art, and the examples illustrated in the figures should not be construed as limiting.

Referring now to the drawings, FIG. 1 is a schematic illustration of an exemplary system for training and inference with cascaded classifier ensembles, according to some embodiments of the present disclosure.

Figure 3:
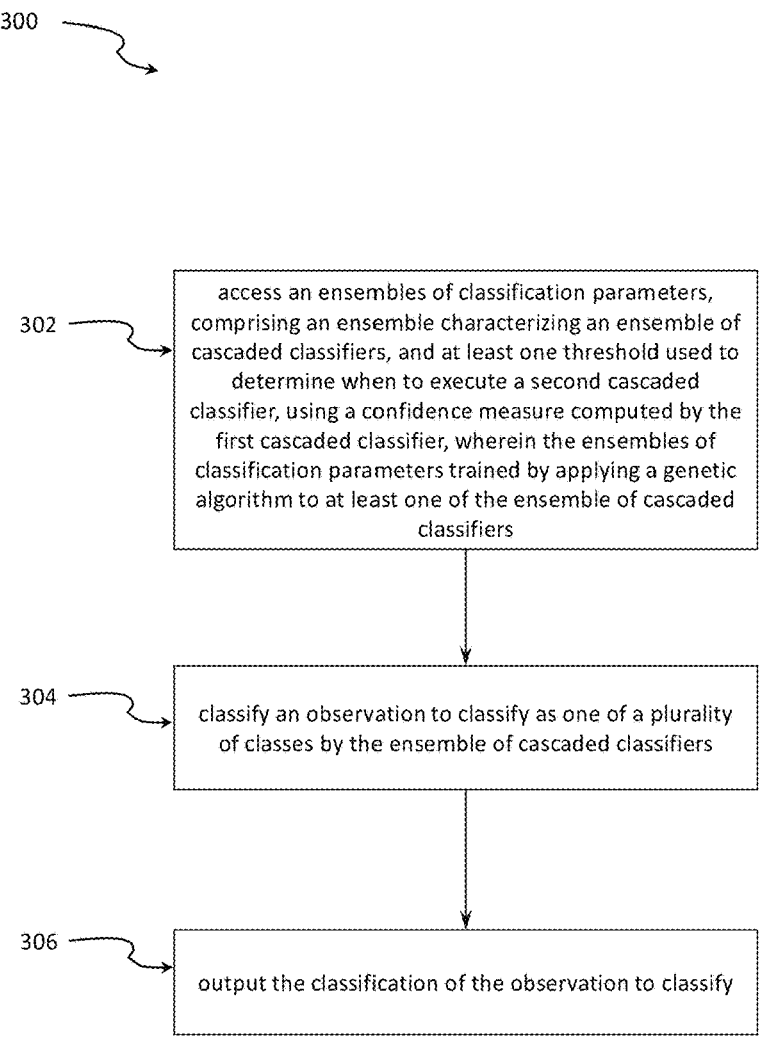
FIG. 3 is a basic flowchart schematically representing an exemplary process for inferencing using cascaded classifier ensembles, according to some embodiments of the present disclosure.
Figure 4:
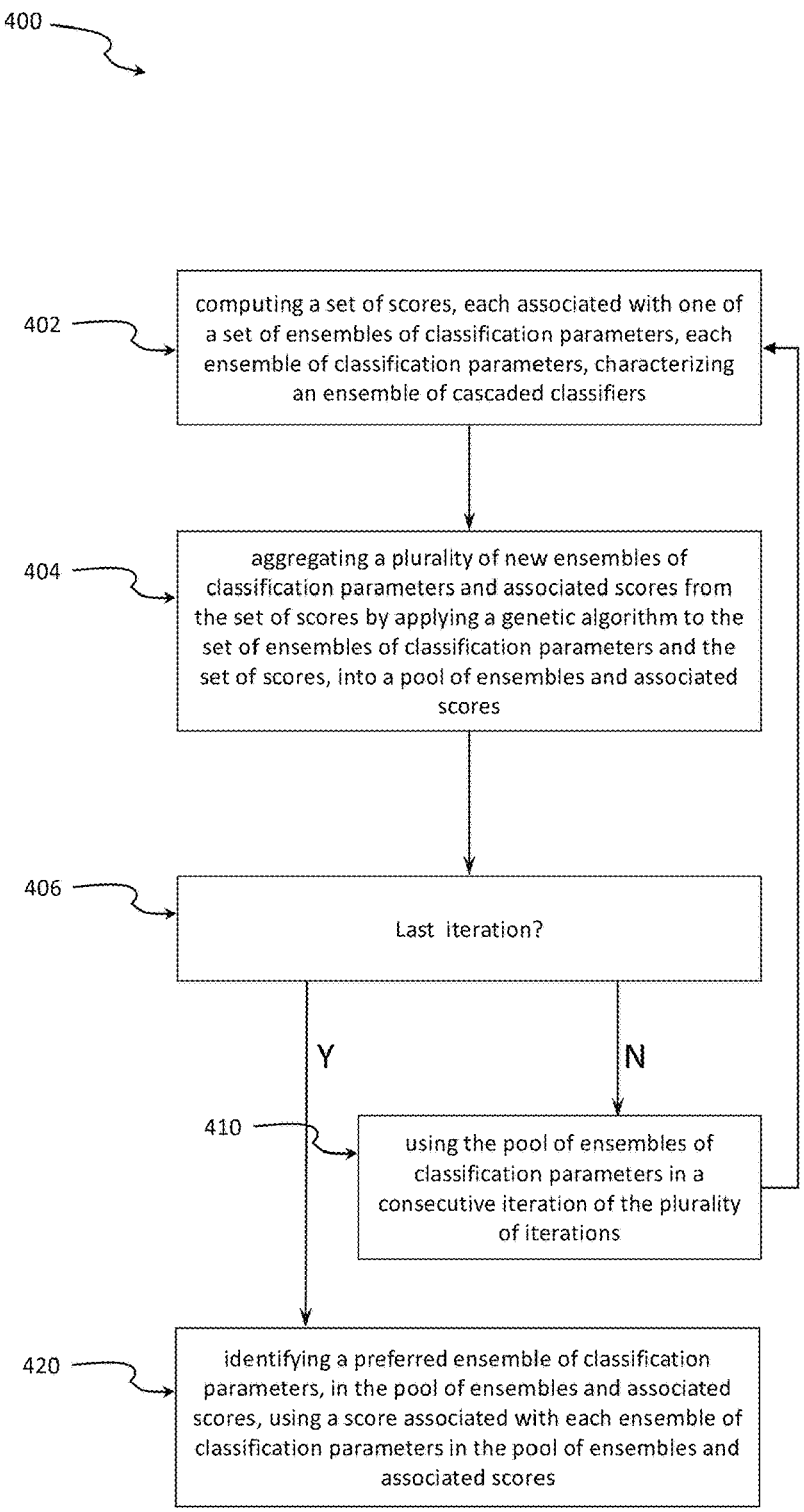
FIG. 4 is a basic flow chart schematically representing an exemplary process for training a system with cascaded classifier ensembles, according to some embodiments of the present disclosure.

An exemplary training system for training and inference with cascaded classifier ensembles, together with network interface shown in 100 may execute processes such as 300 and/or 400 for inference and/or training a system with cascaded classifier ensembles for inference from observations, respectively. Further details about these exemplary processes follow as FIG. 3 and FIG. 4 are described.

The system for training and inference with cascaded classifier ensembles 110 may include a set of interfaces to a network, as well as other devices and instruments. The interfaces may comprises an input interface 112, and an output interface 114. The system for training and inference with cascaded classifier ensembles may also comprise one or more processors 122 for executing processes such as 300 and/or 400, and storage 116, comprising a portion for storing code (program code storage 126) and/or memory for data, such as device and/or machine parameters, control scenarios, and/or the like. The system for training and inference with cascaded classifier ensembles may be physically located on a site, implemented on a mobile device, implemented as distributed system, implemented virtually on a cloud service, on machines also used for other functions, and/or by several options. Alternatively, the system, or parts thereof, may be implemented on dedicated hardware, FPGA and/or the likes. Further alternatively, the system, or parts thereof, may be implemented on a server, a computer farm, the cloud, and/or the likes. For example, the storage 116 may comprise a local cache on the device, and some of the less frequently used data and code parts may be stored remotely.

The input interface 112, and the output interface 114 may comprise one or more wired and/or wireless network interfaces for connecting to one or more networks, for example, a local area network (LAN), a wide area network (WAN), a cellular network, the internet, a combination thereof, and/or the like. The input interface 112, and the output interface 114 may further include one or more buses 130. The buses may comprise wired and/or wireless interconnection interfaces, for example, a universal serial bus (USB) interface, a serial port and/or the like. Furthermore, the output interface 114 may include one or more wireless interfaces for communicating with systems providing training data, requesting inferences for observation, and/or the like and the input interface 112, may include one or more wireless interfaces for receiving information from one or more devices. Additionally, the input interface 112 may include specific means for communication with one or more sensor devices such as a camera, microphone, medical sensor, card reader and/or the like. Similarly, the output interface 114 may include specific means for communication with one or more display devices such as a loudspeaker, display and/or the like.

The one or more processors 122, homogenous or heterogeneous, may include one or more processing nodes arranged for parallel processing, as clusters and/or as one or more multi core one or more processors. The processor may comprise units optimized for deep learning such as Graphic Processing Units (GPU). The storage 116 may include one or more non-transitory persistent storage devices, for example, a hard drive, a Flash array and/or the like. The storage 116 may also include one or more volatile memory devices, for example, a random access memory (RAM) component, enhanced bandwidth memory such as video RAM (VRAM), and/or the like. The storage 116 may further include one or more network storage resources, for example, a storage server, a network attached storage (NAS), a network drive, and/or the like accessible via one or more networks through the input interface 112, and the output interface 114.

The one or more processors 122 may execute one or more software modules such as, for example, a process, a script, an application, an agent, a utility, a tool, an operating system (OS) and/or the like. The software modules may comprise a plurality of program instructions stored in a non-transitory medium within the program code 126, which may reside on the storage medium 116. For example, the one or more processors 122 may execute a process, system for inference with and training of cascaded classifier ensembles such as 300, 400 and/or the like. This processor may generate an optimized cascaded classifier ensemble or classifications using the optimized cascaded classifier.

Figure 2:
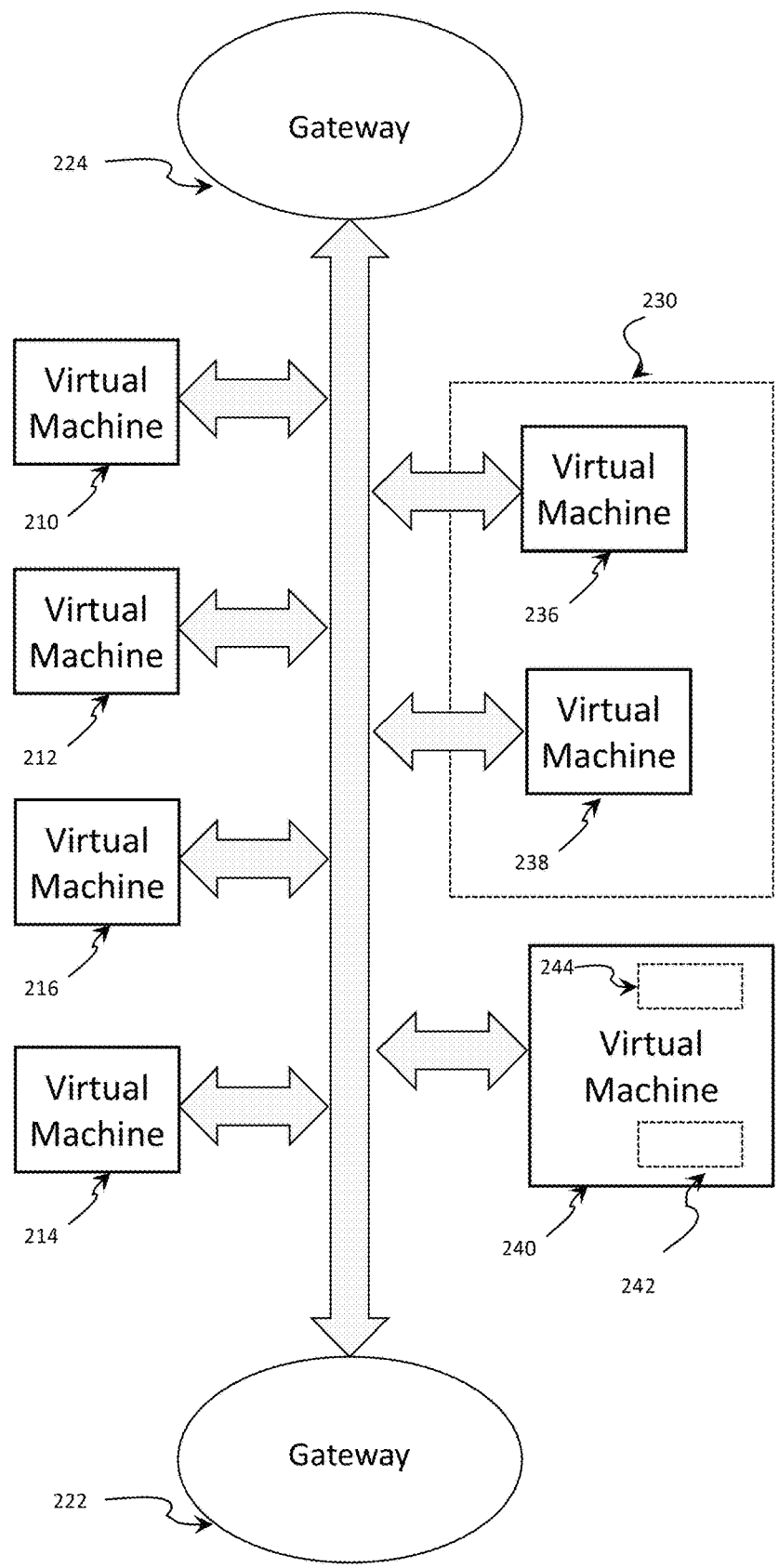
FIG. 2 is a schematic illustration of an exemplary system for distributed training and inference with cascaded classifier ensembles, according to some embodiments of the present disclosure.

Referring now to, FIG. 2, which is a schematic illustration of an exemplary system for distributed training and inference with cascaded classifier ensembles, according to some embodiments of the present disclosure.

The network may be used for running the genetic algorithm, as well as training instances of cascaded classifier ensembles, the classifiers therein, and/or the like. For example, when the classifiers' parameters such as type identifiers and hyperparameters are set, some classifiers may be trained on different computing nodes. The network may allow communication with virtual machines functioning as computing nodes, as shown in 210, 212, 214, 216, 236, 238 and 240. The correspondence between virtual machines and physical machines may be of any positive rational number. For example, the physical machine shown in 230 hosts both virtual machines 236 and 238, however, the virtual machine 240 is implemented by both physical machines 242 and 244.

The network may interface the outside network, e.g. the internet, through gateways such as 224 and 222. Gateways may comprise features such as routing, security, load management, billing, and/or the like however some, or all of these features may also be otherwise handled by other machines in or outside the network.

Referring now to FIG. 3, which is a basic flowchart schematically representing an exemplary process for inferencing using cascaded classifier ensembles, according to some embodiments of the present disclosure.

The exemplary process 300 may be executed for automatic and/or semi-automatic inference tasks, for example analytics, surveillance, video processing, voice processing, machinery maintenance, medical monitoring and/or the like. The process 200 may be executed by the one or more processors 122.

The exemplary process 300 starts, as shown in 302, with accessing an ensembles of classification parameters, comprising an ensemble characterizing an ensemble of cascaded classifiers, and at least one threshold used to determine when to execute a second cascaded classifier, using a confidence measure computed by the first cascaded classifier, wherein the ensembles of classification parameters trained by applying a genetic algorithm to at least one of the ensemble of cascaded classifiers, for example by the process 400 shown in FIG. 4.

The model may be a cascade of a number of classifiers, optionally of different types, wherein the last classifier of the ensemble of cascaded classifiers may generate a conclusive inference when executed, and each other classifier may alternatively indicate to execute the following classifier. The indication may be generated by a confidence measure, one or more values not meeting a threshold, or by an overly large confidence interval for a prediction.

The exemplary process 300 continues, as shown in 304, with classifying an observation to classify as one of a plurality of classes by the ensemble of cascaded classifiers. The plurality of classes may be binary, for example when a software module is malicious, a list of possible people, of medical conditions, or animal types, a numerical estimate, a combination thereof, or the like.

And subsequently, as shown in 300, the process 306 may continue by outputting the classification of the observation to classify, generated by the ensemble of cascaded classifiers, executed by one or more processors 122, for example through the output interface 114, Reference is also made to FIG. 4 which is a basic flow chart schematically representing an exemplary process for training a system with cascaded classifier ensembles, according to some embodiments of the present disclosure.

The one or more processors 122 may execute the exemplary process 400 for a variety of purposes involving training a system with cascaded classifier ensembles, for web advertising customization, security camera display selection, autonomic vehicle control, anomaly detection such as of unauthorized credit card use or cyber-attack and/or the like. Alternatively, the process 400 or parts thereof may be executing using a remote system, an auxiliary system, and/or the like.

The exemplary process 400 starts, as shown in 402, with computing a set of scores, each associated with one of a set of ensembles of classification parameters, each ensemble of classification parameters, characterizing an ensemble of cascaded classifiers.

The ensembles of classification parameters may comprise sets of classifier parameters, each characterizing a cascaded classifier from the ensemble of cascaded classifier. For example, the ensemble may comprise a first set of classifier parameters, characterizing a first cascaded classifier, and a second set of classifier parameters, characterizing a second cascaded classifier, from the ensemble of cascaded classifiers.

The ensembles of classification parameters may further comprise a sequence of thresholds, used to determine when to execute a following cascaded classifier by at least one hardware processor, using a confidence measure computed by a preceding cascaded classifier. The confidence measure may be implemented by a set of thresholds, each qualifying for one of a plurality of classes, and the following classifier may be executed when neither of the set of thresholds is met. Alternatively, the confidence measure may be for example a confidence interval, or a variance estimate of a predicted numerical value.

The classifier parameters of the sets, characterizing a cascaded classifier, may comprise a classifier type, hyper parameters, and the classifier parameters. For example, for a neural network, the parameters of the associated set may comprise the depth, the dimensions of each layer, the layer type, the connectivity regime, for example the convolution filter size, the weights, the activation function, and the like.

The classifiers may be trained in this stage, or following their characterization in stage 404.

The set of scores, which may also be referred to as fitness scores may be calculated by using a labelled validation set on the classification scheme instance characterized by each of the ensembles of cascaded classifiers. The set of scores may also be calculated using an estimate of a measure of the consumption of time, power, memory, communication bandwidth, sensitive data accesses, and the like by the classification scheme instance.

The exemplary process 400 continues, as shown in 404, with aggregating a plurality of new ensembles of classification parameters and associated scores from the set of scores by applying a genetic algorithm to the set of ensembles of classification parameters and the set of scores, into a pool of ensembles and associated scores.

The pool of ensembles and associated scores may be stored on one or computing device, for example in the memory 116. Optionally, the pool of ensembles and associated scores may be purged according to the associated scores of each ensemble, for saving resources such as memory and communication bandwidth.

The exemplary process 400 continues, as shown in 406, with deciding when the training should stop, and the last iteration was performed. The decision may be based, for example, on a pre-defined number of iterations, meeting a score threshold for at least one ensemble, or when no significant improvement in score was found for a number of iterations. For example, when 4 iterations provided no improvement, or 7 iterations provided only 0.01% improvement.

On iterations other than the last, the exemplary process 400 may continue, as shown in 410, with using the pool of ensembles of classification parameters in a consecutive iteration of the plurality of iterations.

The consecutive iteration may be performed on the entire pool of ensembles and associated scores, the plurality of new ensembles of classification parameters and associated scores, or a set of ensembles selected randomly, or according to their associated scores. The consecutive iteration may be performed by repeating step 402.

When the condition for the last iteration is met, the processor or system executing the process 400 may subsequently, as shown in 420, the continue by identifying a preferred ensemble of classification parameters, in the pool of ensembles and associated scores, comprising the plurality of new ensembles of classification parameters and associated scores, using a score associated with each ensemble of classification parameters in the pool of ensembles and associated scores. The identified ensemble of classification parameters may be sent through the output interface 114, a gateway such as 222 or 224, or stored for future use, for example on the memory 116. The ensemble of classification parameters may be used for example by the process 300.

Figure 5:
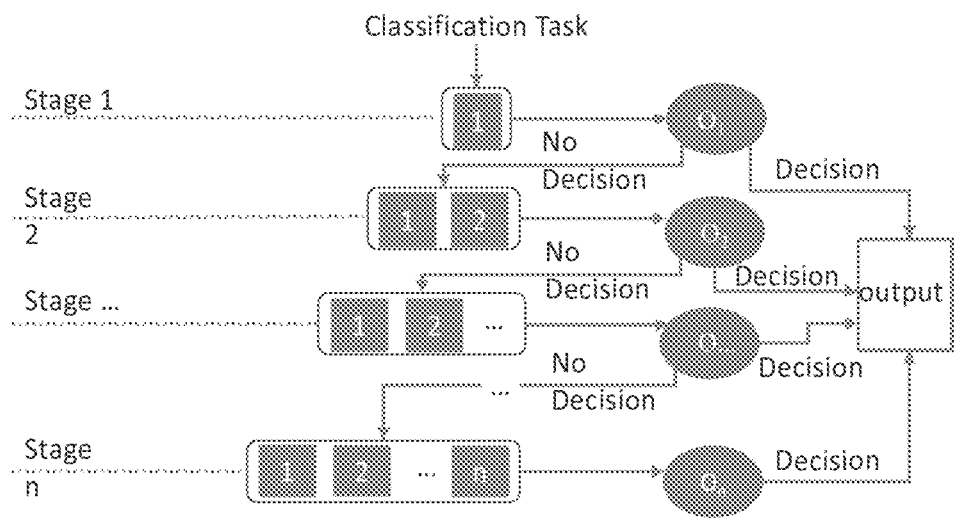
FIG. 5 is a schematic block diagram of an exemplary ensemble of cascaded classifiers, according to some embodiments of the present disclosure.

Reference is also made to FIG. 5, which is a schematic block diagram of an exemplary ensemble of cascaded classifiers, according to some embodiments of the present disclosure.

The disclosure comprise two phases: a "training phase", which is responsible for generating a classification schema, and the "classification phase", which is the operational phase that utilizes the classification schema, and it is responsible for providing classification of incoming observations. The exemplary block diagram of FIG. 5 emphasizes the "classification phase" of the present disclosure, however may also help understanding the "training phase".

The classification phase of the disclosure may be performed using a staged classification schema that was trained during the "training phase" described in FIG. 4, and in further details in FIG. 8. Parameter of the classification schema may comprise the number of classification stages, what classifiers, i.e. type and hyper-parameters thereof are used in each stage and, for each classifier, a set of classification thresholds to use over that classifier's output, which may represent confidence scores for the classification, or the inference in general. These classification thresholds may be used to decide if the output of a classification stage is conclusive or not, i.e. determine when to execute the second cascaded classifier the by at least one hardware processor, using a confidence measure computed by the first cascaded classifier. When the classification is conclusive, the classification process may be stopped at the current stage, and otherwise, the method uses the next classification stage. In many classification tasks, since the system is expected to generate a classification result, the final stage may not pass the decision to a next stage, and thus, the classification threshold may determine the final classification rule. For example, the thresholds may determine a decision such as "if the confidence score of the stage is higher than 0.7 the output should be A, otherwise it should be B", "The outputs A, B and C require a confidence score of the stage is higher than 0.8, otherwise the output may be D or E", or "The standard deviation of the each estimated numerical value may be at most 0.1 of the estimated numerical value".

An exemplary process of classification-phase for n stages is described in FIG. 5: When the system is assigned with a classification task, the input observation may be passed to the classification models of stage 1. The output of this stage ($O_1$) is observed. When $O_1$ is conclusive (i.e. classification confidence is high/low enough) the system may use $O_1$ to provide output and the classification process may be terminated. Otherwise, the task may be passed to the next stage where the classification models of that stage are applied and the output ($O_2$) is observed similarly to the output of the previous stage. The classification may continue serially with the phases until output $O_1$ ($1<=i<n$) satisfies the thresholds of that stage. When the process reaches the final stage (n), the system may use the classification boundaries with $O_n$ as the classification output.

Figure 6:
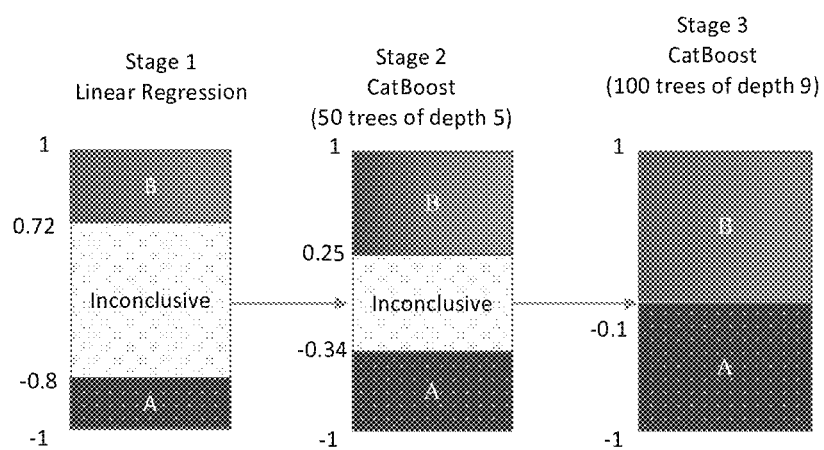
FIG. 6 is a schematic block diagram of an exemplary set of thresholds for a cascade of binary classifiers, according to some embodiments of the present disclosure.

Reference is also made to FIG. 6, which is a schematic block diagram of an exemplary set of thresholds for a cascade of binary classifiers, according to some embodiments of the present disclosure.

FIG. 6 illustrates the confidence thresholds of an exemplary Classification Schema Instances (CSI) of three stages, where the classification task is binary classification of an observation, i.e. when the observation is from class "A" (dark and dotted background) or class "B" (gradient background). In this example, positive confidence score of classifiers that are close to 1 means that a classifier has high confidence that the observation is from class "B" and negative scores close to −1 means that a classifier has high confidence that the observation is from class "A". The first stage may use a linear regression classifier, as opposed to the second stage and third stage, which may use CatBoost classifiers with different hyper-parameters. The classification boundaries of the first stage are 0.72 for class "B" and −0.8 for class "A", i.e. if the confidence is higher than 0.72 the schema will return "B", and if the confidence is lower than −0.8 the schema will return "A", and otherwise (bright and dotted background), the CSI may continue to stage 2.

The classification boundaries of stage 2 are 0.25 for class "B" and −0.34 for class "A" and the single threshold of the final stage is −0.1.

Figure 7:
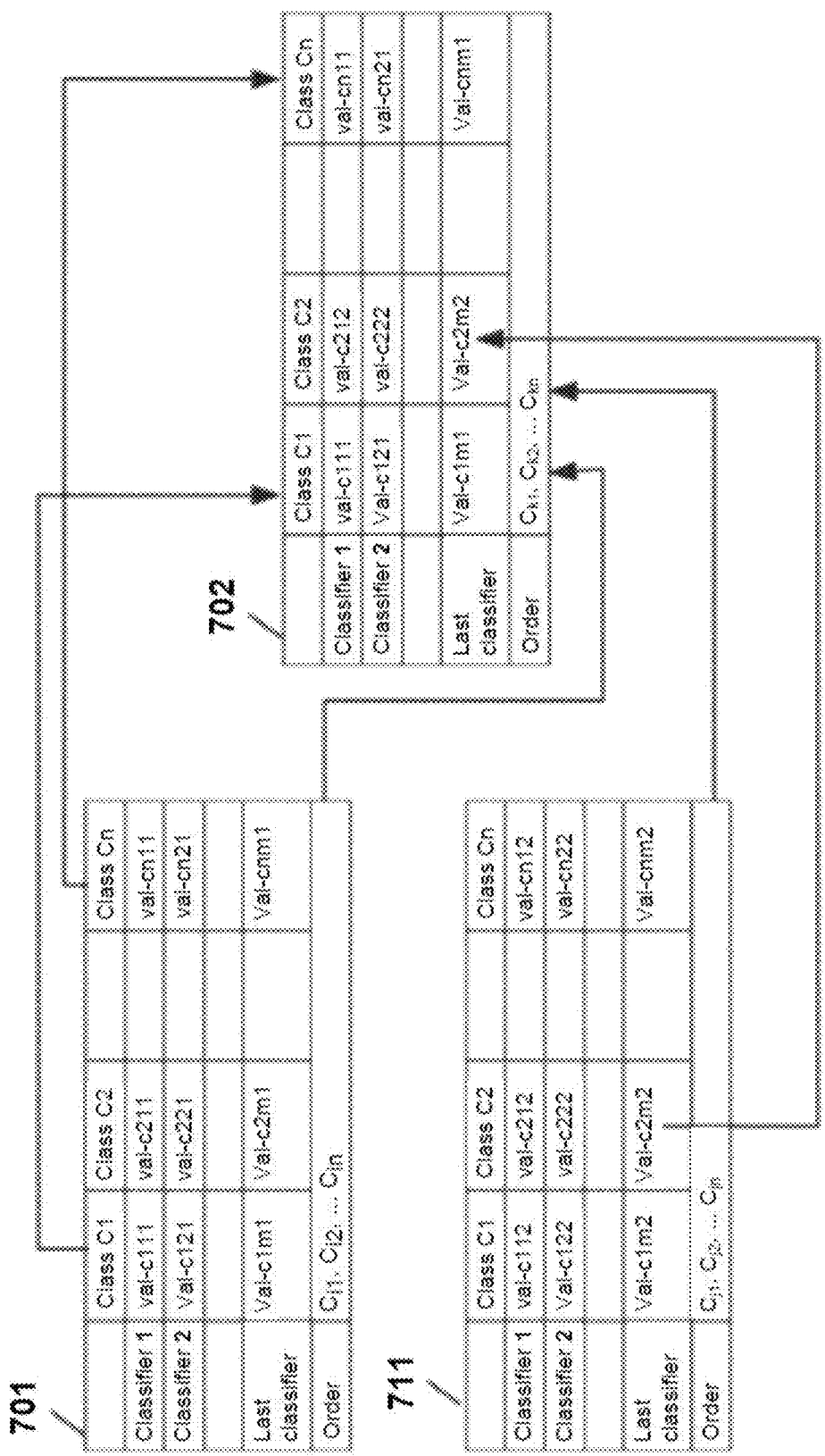
FIG. 7 is a schematic block diagram of an exemplary genetic crossover, according to some embodiments of the present disclosure.

Reference is also made to FIG. 7, which is a schematic block diagram of an exemplary genetic crossover, according to some embodiments of the present disclosure.

In this exemplary genetic crossover 700, an elementary building block of a set of classification schema parameters is a sequence of set of classifier parameters comprising class threshold values as representation of the plurality of sets classifier parameters where each of the threshold values is associated with a class from a plurality of classes.

In addition, each of the sets classifier parameters values may be associated with one of the classifiers from the cascade of classifiers. Optionally, in step 404 the one or more processors 122 computes at least one new set of classifier parameters 702 from the plurality of parent set of classifier parameters by selecting from each of the plurality of parent set of classifier parameters, shown in 701 and 711, at least some elementary building blocks. The building blocks may be single parameters such as respective observation class thresholds for the plurality of classes, parameters of one or more decision trees, one or more neural network layers, a cluster of parameter nodes in a Markov random field, one or more thresholds, SVM parameters, and/or the like. Optionally, the plurality of threshold sequences comprises first set of classifier parameters 701 and second parent set of classifier parameters 711. Optionally, each set of classifier parameters of each of the sets of set of classifier parameters is associated with one of the plurality of classifiers cascade of classifiers according to an identified cascade order.

Reference is also made to FIG. 8, which is a pseudocode of an exemplary genetic algorithm, according to some embodiments of the present disclosure.

The exemplary genetic algorithm may be performed during the training phase of the disclosure implementation. The "training phase" may generate the classification schema for the classification phase. Within the training phase, an AI search algorithm may be executed by at least one processor, to find an optimal CSI under the classification quality and cost constraints of the system. In some embodiments, a local search algorithm, which is an iterative genetic-algorithm, is used. The stages of this genetic algorithm may be adapted for the CSI optimization task. In this exemplary algorithm, the population instances of the genetic search are CSIs. First, a population of K CSIs is generated using some initialization method, for example, random initialization. The initialization may comprise inclinations, for example to increase variety, or to generate classifiers that are more complex for later stages.

Followingly, several iterations may be performed. In each iteration, the population of CSIs may be evaluated, and a new population may be generated. The score of each CSI in the population may be evaluated by applying the classification schema on tasks taken from a labeled validation set. A "fitness function" that represents the preferences and constraints of the system may be applied to rank the schema.

The training may start by initiating a population of K instances, also referred to as CSIs. Followingly, a sequence of iteration may be performed until a maximal, or a pre-defined adequate fitness score is reached, or convergence is apparent by lack of significant improvement for several iteration.

Each iteration may comprise evaluating the "fitness" score of each CSI in the population, finding the fittest CSI and storing it.

Iterations may also comprise creating a new CSI population of size K for the next iteration, which may be performed by K repetitions of selecting randomly two or more CSIs, potentially wherein fit instances have higher probability of being selected, performing a crossover over the two or more CSIs to create a new CSI, and with a small probability make a minor change to the instance, which may also be referred to as a mutation. Followingly, the new instance may be added to the next iteration population The fitness function may comprise a plurality of terms, for example a quality term based on accuracy of classification of the plurality of observations, used by the one or more processors 122 as the validation set. Additionally a cost term, indicative of a memory size and/or power consumption of cascaded classifiers used when classifying the plurality of observations used as validation set, and a speed term indicative of the time consumption of cascaded classifiers used when classifying the plurality of observations to classify, for example the validation set, by the ensemble of cascaded classifiers using the respective ensemble of cascaded classifiers. The fitness function may be an identified weight function, for example of an equal weight, of the terms.

The population of the next iteration may include some existing CSIs and new CSIs generated by performing a procedure, called "crossover", over the current iteration's CSIs. A crossover is a function that chooses a number of existing CSIs, and generates a new CSI by combining and merging the chosen existing CSIs. The number may be 2, however is not limited, and 3, 4 and possibly all the CSIs may be included. The crossover may be further modified by a random change, which may be referred to as a "mutation". The population may be generated by applying a crossover N times (N is the population size) on randomly selected CSIs, CSIs having higher fitness function value, or a random selection inclined to prefer CSIs with a higher fitness. The chance of a CSI to be selected for crossover may depend on the fitness score of the CSI, i.e. CSIs with high fitness score may be more likely to be selected for crossover. The algorithm may halt after a pre-defined number of iterations, when at least one CSI satisfies a pre-defined clause or when the results converge of several iterations did not yield a better CSI than the one already found. The pseudo-code of the algorithm is presented in FIG. 8.

In the initial, first iteration of the plurality of iterations, parameters such as the cascade length or the number of classifiers, may be either fixed or varied, i.e. at least one of a set of ensembles of classification parameters may comprising a different number of sets of classifier parameters, characterizing the different number cascaded classifiers, and at least one of the sets of classifier parameters comprising a classifier type identifier. Several exemplary initialization strategies, for creating an initial population, on which the genetic-algorithm may begin its training process, are disclosed herein.

In Random initialization, each CSI may be initiated randomly, based on pre-configured boundaries for each property, for example CSI depth, classifier type identifier, hyper-parameters, and thresholds. For example, using the following pre-configured boundaries may be used: The number of stages may be between 2 and 4. The classifier types may one of the following: Random Forest, XGBoost, CatBoost, and decision tree. The hyper-parameter max depth may be between 5 and 20 and the number of trees (For types other than decision tree) between 20 and 100. The thresholds may be between −1 and 1 so that lower threshold is lower than the upper threshold.

Alternatively, the classifier type identifier may be support version machine, linear regression, tree ensemble classifier, and neural network, and a subtype identifier may apply to one or more of the types. The disclosure may be used to optimize hyper-parameters of classifiers of the same type, however in this example, the set of classifier parameters comprises a classifier type identifier.

An exemplary possible CSI may be initiated as having three stages: Stage1 may be a Random-Forest classifier of 64 trees of depth 7, with lower and upper thresholds of 0.11 and 0.77.

Stage2 may be an XGBoost classifier with 34 trees of depth 15, with lower and upper thresholds of −0.54 and 0.5. And stage3, the final stage may be a Random-Forest of 86 trees of depth 6, with threshold of 0.22.

Some initialization methods may share some similarities with the "Random initialization" process. The stages may be initialized randomly under the constraint that each stage has higher computational complexity than the previous stage. For example, the computational complexity of the Random-Forest classifier may be controlled by increasing or decreasing the number of trees it uses and by controlling the depth of each tree. This method may requires defining complexity order between classifiers and hyper-parameters. Notice that with regard to the CSI example shown in FIG. 6, the "Random Initialization" is not valid for the "Growing complexity initialization because the second stage has less trees than the first stage and the final stage has less depth than the second stage.

Baseline threshold initialization technique may be focused on determining the thresholds of the CSI, while other attributes of the CSI, such as number of stages, classifiers types to use, and hyper-parameters, may be initiated with "Random initialization" or "Growing complexity initialization" techniques.

In baseline threshold initialization, the thresholds of each classification stage may be determined based on a baseline classifier, or classifiers trained on the training set and evaluated using the validation set.

First, for each stage in the CSI the process determines a corresponding baseline model (CBM). The simplest method to determine a CBM is to use a single pre-defined classifier, for example an XGBoost classifier with 70 trees of depth 8, or to use the classifier's type and hyper-parameters of the current classification stage. The CBM may be evaluated using the validation set to find the threshold that optimizes the classification's quality. This threshold may be used to generate a classification boundaries for the CSI, for example by drawing randomly the upper and lower thresholds using a normal distribution with a mean corresponding to a calculated optimal threshold and a random standard deviation, of course under the constraints that the threshold are between −1 and 1 and that the lower threshold is smaller than the upper threshold.

The fitness score may be lineally combined, based on some quality measures that include the classification quality and other measures such as CPU consumption, classification speed, and the like. A possible fitness function may be a linear combination of the form: $w_1 *m_1 + \ldots + w_n m_n$, where $m_1, \ldots m_n$, may be the quality measures to consider, and $w_1, \ldots w_n$ are pre-defined weights that indicate the importance of the weights.

Alternatively, the fitness score may be based on multiplication or other functions of the elements. For example, the fitness score may also be defined using some non-linear combination or a based on pre-defined rules. For another example, on a rule that uses the classification.

The crossover is a method for computing a plurality of new ensembles of classification parameters by applying a genetic algorithm comprises computing at least one new ensemble of classification parameters comprising at least part of each of a plurality of ensembles of classification parameters, each selected according to the set of scores.

The Crossover may be performed by Random Stages selection.

Random Stages selection may use #parent CSIs for the crossover. First the number of stages may be randomly selected, wherein the minimal and maximal number may be based on the levels of the parent CSIs. Next, for each stage i, the processor performing the crossover may randomly select a parent with at least i stages and use its stage configuration.

The crossover may also be performed by Stage combination.

Stage combination, also given A parent CSI to crossover, may start by randomly selecting the number of stages (where the minimal and maximal number may be based on the levels of the parent CSIs). Next, for each stage i, processor performing the crossover may select all parents with at least i stages and combine their i-th stage. The combination may be performed by selecting the majority of using average or median value for numeric values.

The crossover may use K parent ensemble of classification parameters. The plurality of parent ensembles of classification parameters in the following example is 3 ensembles of classification parameters of the set of ensembles of classification parameters, showing three CSI parents wherein the f-th stage is as following: CSI1 is a Random Forest with 60 trees of depth 10; CSI2 is a Random Forest with 40 trees of depth 15; and CSI3 is XGboost with 80 trees of depth 6.

The new CSI t-th stage may be a Random Forest classifier as the majority of parents, with 60 trees of depth 7, which is the mean value of the hyper-parameters. The threshold may also be set using the mean or median value of the parents. Alternatively, for example, the classifier type may be randomly selected, and/or the hyperparameters may be set according to a geometric average.

The crossover may also be similarity based, using a similarity function over CSIs provided such function is available. The CSI crossover may first select a group of N fit CSIs. Next, a single CSI is drawn randomly from the group and the method calculates the similarity of other CSIs in that group to the selected CSI. The K'-1 most similar may be selected for crossover, giving rise to a crossover function of K CSIs, and the "Stage combination" crossover is performed on these CSI.

The crossover may also comprise one or more mutations with a given probability, modifying at least one set of classifier parameters or the at least one threshold of the at least one new ensemble of classification parameters.

A Random mutation may, with a small probability, for example 0.01 or 0.05, apply a random change to one of the hyper-parameters or thresholds in the CSI, or alternatively change a classifier type. The size of the change may also be random and may be bounded by pre-defined configuration. For example, thresholds mutation may be between −0.05 and 0.05 and max depth may be reduced or increased by 1 or 2. This may be an example of computing a plurality of new ensembles of classification parameters comprising modifying a classifier type identifier of at least one cascaded classifier from the ensemble of classifiers, as well as adding a new set of classifier parameters, characterizing a new cascaded classifier added to the ensemble of classifiers or removing at least one set of classifier parameters, characterizing a removed cascaded classifier from the ensemble of classifiers.

The mutation may be iteration sensitive, for example a random mutation wherein the probability of the mutation and the magnitude of the change differs between iteration of the genetic search. For example, the chance for a mutation and the magnitude of the mutation at early stages may be higher, or lower than in later stages.

Furthermore, Stage swapping mutation may be performed. With a small probability, for example 0.005 or 0.04, the order of two random stages in the CSI may be swapped. When one of the stages swapped is the final stage, the threshold of the new final stage may be set, for example to the average between the lower and upper threshold of that stage. The thresholds of the stage that was the final stage, and therefore had a single threshold t, may be drawn randomly so that the upper threshold is larger than t and the lower threshold is smaller than t, or alternatively, for example in a symmetric manner around the threshold.

It is expected that during the life of a patent maturing from this application many relevant classifiers will be developed and the scope of the term classifier is intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a processor" or "at least one processor" may include a plurality of processors, including type mixtures thereof.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. Furthermore, ranges may be provided as exemplary and should not be construed as limiting the scopes of the claims.

Whenever a numerical range is indicated herein, it is meant to include any cited numeral, fractional when applicable or integral, within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the computer science, electrical engineering, statistics and computer programming.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicants that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present disclosure. To the extent that section headings are used, they should not be construed as necessarily limiting. In addition, any priority documents of this application is/are hereby incorporated herein by reference in its/their entirety.

What is claimed is:

1. A method for optimizing an ensemble of cascaded classifiers for a task of classification of a plurality of observations, each to a class from a plurality of classes, the method comprising:

in each of a plurality of iterations:
computing a set of scores, each associated with one of a set of ensembles of classification parameters, each ensemble of classification parameters characterizing an ensemble of cascaded classifiers for execution by at least one hardware processor, each ensemble of classification parameters comprising:
a first set of classifier parameters, characterizing a first cascaded classifier from the ensemble of cascaded classifiers, wherein the first cascaded classifier is a linear regression classifier;
a second set of classifier parameters, characterizing a second cascaded classifier from the ensemble of cascaded classifiers, wherein the second cascaded classifier is a first CatBoost classifier having a first number of trees of a first depth;
a third set of classifier parameters, characterizing a third cascaded classifier from the ensemble of cascaded classifiers, wherein the third cascaded classifier is a second CatBoost classifier having a second number of trees of a second depth, wherein the second number of trees is greater than the first number of trees and the second depth is greater than the first depth; and
a sequence of confidence thresholds used to determine when to execute the second cascaded classifier and the third cascaded classifier by at least one hardware processor, using a confidence measure computed by the first cascaded classifier and the second cascaded classifier, wherein the first cascaded classifier has a first upper classification boundary and a first lower classification boundary, wherein the second cascaded classifier has a second upper classification boundary and a second lower classification boundary, wherein a range between the first upper classification boundary and the first lower classification boundary is greater than a range between the second upper classification boundary and the second lower classification boundary;

aggregating a plurality of new ensembles of classification parameters and associated scores from the set of scores by applying a genetic algorithm to the set of ensembles of classification parameters and the set of scores, into a pool of ensembles and associated scores; and using the pool of ensembles of classification parameters in a consecutive iteration of the plurality of iterations; and identifying a preferred ensemble of classification parameters, in the pool of ensembles and associated scores, using a score associated with each ensemble of classification parameters in the pool of ensembles and associated scores.

2. The method of claim 1, wherein computing a plurality of new ensembles of classification parameters by applying a genetic algorithm comprises computing at least one new ensemble of classification parameters comprising at least part of each of a plurality of ensembles of classification parameters, each selected according to the set of scores.

3. The method of claim 2, wherein computing the at least one new ensembles of classification parameters further comprises modifying at least one set of classifier parameters or the at least one threshold of the at least one new ensemble of classification parameters.

4. The method of claim 2, wherein a plurality of parent ensembles of classification parameters comprises at least two ensembles of classification parameters of the set of ensembles of classification parameters.

5. The method of claim 2, wherein computing the at least one new ensembles of classification parameters further comprises adding a new set of classifier parameters, characterizing a new cascaded classifier added to the ensemble of classifiers.

6. The method of claim 2, wherein computing the at least one new ensembles of classification parameters further comprises removing at least one set of classifier parameters, characterizing a removed cascaded classifier from the ensemble of classifiers.

7. The method of claim 1, wherein each set of classifier parameters further comprising a classifier type identifier, and computing a plurality of new ensembles of classification parameters comprising modifying a classifier type identifier of at least one cascaded classifier from the ensemble of classifiers.

8. The method of claim 7, wherein the classifier type identifier refers to a type list, comprising at least one member of a group, consisting of support version machine, linear regression, tree ensemble classifier, and neural network.

9. The method of claim 7, wherein in a first iteration of the plurality of iterations, at least one of a set of ensembles of classification parameters comprises a different number of sets of classifier parameters, characterizing a different number of cascaded classifiers, and at least one of the sets of classifier parameters comprises a classifier type identifier.

10. The method of claim 1, wherein computing a score while classifying, using the respective ensemble of cascaded classifiers, each of the plurality of observations to classify as one of the plurality of classes comprises:

computing a quality term indicative of an accuracy of classifying the plurality of observations to classify by the ensemble of cascaded classifiers using the respective ensemble of cascaded classifiers;

computing a cost term indicative of a memory size and power consumption of cascaded classifiers used when classifying the plurality of observations to classify by the ensemble of cascaded classifiers using the respective ensemble of cascaded classifiers;

computing a speed term indicative of a time consumption measure of cascaded classifiers used when classifying the plurality of observations to classify by the ensemble of cascaded classifiers using the respective ensemble of cascaded classifiers; and applying an identified weight function to the quality term, the cost term, the speed term and an identified tradeoff factor, indicative of a tradeoff between classification quality and classification speed, to produce the score.

11. A system for optimizing an ensemble of cascaded classifiers for a task of classification of an observation to a class from a plurality of classes, comprising at least one hardware processor adapted to:

in each of a plurality of iterations:

compute a set of scores, each associated with one of a set of ensembles of classification parameters, each ensemble of classification parameters characterizing an ensemble of cascaded classifiers for execution by at least one hardware processor, each ensemble of classification parameters comprising:

a first set of classifier parameters, characterizing a first cascaded classifier from the ensemble of cascaded classifiers, wherein the first cascaded classifier is a linear regression classifier;

a second set of classifier parameters, characterizing a second cascaded classifier from the ensemble of cascaded classifiers, wherein the second cascaded classifier is a first CatBoost classifier having a first number of trees of a first depth;

a third set of classifier parameters, characterizing a third cascaded classifier from the ensemble of cascaded classifiers, wherein the third cascaded classifier is a second CatBoost classifier having a second number of trees of a second depth, wherein the second number of trees is greater than the first number of trees and the second depth is greater than the first depth; and a sequence of confidence thresholds used to determine when to execute the second cascaded classifier and the third cascaded classifier by at least one hardware processor, using a confidence measure computed by the first cascaded classifier and the second cascaded classifier, wherein the first cascaded classifier has a first upper classification boundary and a first lower classification boundary, wherein the second cascaded classifier has a second upper classification boundary and a second lower classification boundary, wherein a range between the first upper classification boundary and the first lower classification boundary is greater than a range between the second upper classification boundary and the second lower classification boundary;

aggregate a plurality of new ensembles of classification parameters and associated scores from the set of scores by applying a genetic algorithm to the set of ensembles of classification parameters and the set of scores, into a pool of ensembles and associated scores; and use the pool of ensembles of classification parameters in a consecutive iteration of the plurality of iterations; and identify a preferred ensemble of classification parameters, in the pool of ensembles and associated scores, by comparing a score associated each ensemble of classification parameters in the pool of ensembles and associated scores.

12. The system of claim 11, wherein computing a plurality of new ensembles of classification parameters by applying a genetic algorithm comprises computing at least one new ensemble of classification parameters comprising at least part of each of a plurality of ensembles of classification parameters, each selected according to the set of scores.

13. The system of claim 12, wherein computing the at least one new ensembles of classification parameters further comprises adding a new set of classifier parameters, characterizing a new cascaded classifier added to the ensemble of classifiers.

14. The system of claim 12, wherein computing the at least one new ensembles of classification parameters further comprises removing at least one set of classifier parameters, characterizing a removed cascaded classifier from the ensemble of classifiers.

15. The system of claim 11, wherein each set of classifier parameters further comprising a classifier type identifier, and computing a plurality of new ensembles of classification parameters comprising modifying a classifier type identifier of at least one cascaded classifier from the ensemble of classifiers.

16. The system of claim 15, wherein the classifier type identifier refers to a type list, comprising at least one member of a group, consisting of support version machine, linear regression, tree ensemble classifier, and neural network.

17. The system of claim 15, wherein in a first iteration of the plurality of iterations, at least one of a set of ensembles of classification parameters comprises a different number of sets of classifier parameters, characterizing a different number of cascaded classifiers, and at least one of the sets of classifier parameters comprises a classifier type identifier.

18. The system of claim 11, wherein computing a score while classifying, using the respective ensemble of cascaded classifiers, each of a plurality of observations to classify as one of the plurality of classes comprises:

computing a quality term indicative of an accuracy of classifying the plurality of observations to classify by the ensemble of cascaded classifiers using the respective ensemble of cascaded classifiers;

computing a cost term indicative of a memory size and power consumption of cascaded classifiers used when classifying the plurality of observations to classify by the ensemble of cascaded classifiers using the respective ensemble of cascaded classifiers;

computing a speed term indicative of a time consumption measure of cascaded classifiers used when classifying the plurality of observations to classify by the ensemble of cascaded classifiers using the respective ensemble of cascaded classifiers; and applying an identified weight function to the quality term, the cost term, the speed term and an identified tradeoff factor, indicative of a tradeoff between classification quality and classification speed, to produce the score.

19. A system for a classification task comprising at least one hardware processor adapted to execute an ensemble of cascaded classifiers for a task of classification of an observation to a class from a plurality of classes, wherein the at least one hardware processor is adapted to:

access an ensembles of classification parameters, comprising an ensemble characterizing an ensemble of cascaded classifiers, and at least one threshold used to determine when to execute a second cascaded classifier, using a confidence measure computed by a first cascaded classifier, wherein the ensembles of classification parameters trained by applying a genetic algorithm to at least one of the ensemble of cascaded classifiers;

classify an observation to classify as one of a plurality of classes by the ensemble of cascaded classifiers; and output the classification of the observation to classify, wherein the ensemble of cascaded classifiers is trained by applying a genetic algorithm to at least one set of ensemble of cascaded classifiers by:

in each of a plurality of training iterations:

computing a set of scores, each associated with one of a set of ensembles of classification parameters, each ensemble of classification parameters characterizing an ensemble of cascaded classifiers for execution by at least one hardware processor, each ensemble of classification parameters comprising:

a first set of classifier parameters, characterizing a first cascaded classifier from the ensemble of cascaded classifiers, wherein the first cascaded classifier is a linear regression classifier;

a second set of classifier parameters, characterizing a second cascaded classifier from the ensemble of cascaded classifiers, wherein the second cascaded classifier is a first CatBoost classifier having a first number of trees of a first depth;

a third set of classifier parameters, characterizing a third cascaded classifier from the ensemble of cascaded classifiers, wherein the third cascaded classifier is a second CatBoost classifier having a second number of trees of a second depth, wherein the second number of trees is greater than the first number of trees and the second depth is greater than the first depth; and a sequence of confidence thresholds used to determine when to execute the second cascaded classifier and the third cascaded classifier by at least one hardware processor, using a confidence measure computed by the first cascaded classifier and the second cascaded classifier, wherein the first cascaded classifier has a first upper classification boundary and a first lower classification boundary, wherein the second cascaded classifier has a second upper classification boundary and a second lower classification boundary, wherein a range between the first upper classification boundary and the first lower classification boundary is greater than a range between the second upper classification boundary and the second lower classification boundary;

aggregating a plurality of new ensembles of classification parameters and associated scores from the set of scores by applying a genetic algorithm to the set of ensembles of classification parameters and the set of scores, into a pool of ensembles and associated scores; and using the pool of ensembles of classification parameters in a consecutive iteration of the plurality of iterations; and identifying a preferred ensemble of classification parameters, in the pool of ensembles and associated scores, by comparing a score associated each ensemble of classification parameters in the pool of ensembles and associated scores.

* * * * *